(12) United States Patent
Belanger

(10) Patent No.: US 12,501,859 B2
(45) Date of Patent: Dec. 23, 2025

(54) FIELD HARVESTING DEVICE FOR SMALL FRUITS

(71) Applicant: Martin Belanger, Riviere-Bleue (CA)

(72) Inventor: Martin Belanger, Riviere-Bleue (CA)

(*) Notice: Subject to any disclaimer, the term of this patent is extended or adjusted under 35 U.S.C. 154(b) by 386 days.

(21) Appl. No.: 17/983,360

(22) Filed: Nov. 8, 2022

(65) Prior Publication Data

US 2023/0148204 A1 May 11, 2023

(30) Foreign Application Priority Data

Nov. 11, 2021 (GB) .................................... 2116279

(51) Int. Cl.
*A01D 46/24* (2006.01)
*A01D 46/26* (2006.01)

(52) U.S. Cl.
CPC .......... *A01D 46/24* (2013.01); *A01D 46/264* (2013.01)

(58) Field of Classification Search
CPC .............................. A01D 46/24; A01D 46/264
See application file for complete search history.

(56) References Cited

U.S. PATENT DOCUMENTS

| 1,665,404 | A | | 4/1928 | Crabill | |
|---|---|---|---|---|---|
| 1,751,601 | A | * | 3/1930 | Raney | A01D 41/1208 56/473.5 |
| 2,571,865 | A | | 10/1951 | Greedy et al. | |
| 2,656,667 | A | * | 10/1953 | Smith | A01D 45/30 56/16.6 |
| 2,848,103 | A | | 8/1958 | Elliott | |

(Continued)

*Primary Examiner* — Joseph M Rocca
*Assistant Examiner* — Julia C Tran

(57) ABSTRACT

A field harvesting device for small fruits having a harvesting header, a hitching pole and framework on wheels so as to be pulled by a moving motorized machine and the harvesting header is a single assembly comprised of a frame, conveyor, dividing cones, and a plurality of assemblies formed at first by worm screws, from each of which individual worm screw extends a rotating separator from which extends a shaft extending into a sprocket wheel. Two of the assemblies working as a pair of axially parallel aligned assemblies such that when one rotating separator, forming part of the pair, rotates clockwise and faces the other rotating separator forming part of the same pair rotates counterclockwise. The counter rotating separator having paddles which are configured for stripping fruits off of fruit plants; the stripped fruits are projected upwards by the action of the paddles rotating in an upward direction; the fruits fall onto U shaped cups located on the underneath supports, and roll off onto a primary conveyor. The primary conveyor conveys the fruits to an elevator conveyor which directs the fruits into a container. The assemblies are linked together at the back of the harvesting header by way of a roller chain connected to the sprocket wheels which are rotationally connected to pillow bearings mounted to the harvesting header frame and covered by a back cover. The assemblies are hold at the front end of the device by supports brackets mounted on a header frame member, which are rotationally connected by way of bearings that allow rotational movements of the assemblies.

7 Claims, 6 Drawing Sheets

(56) References Cited

U.S. PATENT DOCUMENTS

| | | | | |
|---|---|---|---|---|
| 3,153,311 A | * | 10/1964 | Pool | A01D 46/24 56/328.1 |
| 3,222,855 A | * | 12/1965 | Lasswell, Jr. | A01D 46/24 56/50 |
| 3,253,392 A | * | 5/1966 | Barrat | A01D 46/24 56/328.1 |
| 3,260,041 A | | 7/1966 | McRoberts et al. | |
| 3,407,580 A | * | 10/1968 | Murray | A01D 46/24 56/328.1 |
| 3,427,796 A | * | 2/1969 | Mccray | A01D 46/24 56/328.1 |
| 3,452,527 A | * | 7/1969 | Reynolds | A01D 46/24 99/640 |
| 3,464,195 A | * | 9/1969 | Crichfield | A01D 46/24 56/328.1 |
| 3,543,494 A | * | 12/1970 | Bartram | A01D 46/24 56/328.1 |
| 3,736,738 A | * | 6/1973 | Carr | A01D 46/28 56/130 |
| 3,830,048 A | * | 8/1974 | Ervin | A01D 46/28 56/331 |
| 3,838,559 A | * | 10/1974 | Stang | A01D 46/00 56/327.1 |
| 4,172,352 A | * | 10/1979 | McCarthy | A01D 46/28 56/DIG. 15 |
| 4,227,366 A | | 10/1980 | Pucher | |
| 4,428,182 A | * | 1/1984 | Allen | A01D 41/1208 280/492 |
| 4,487,004 A | | 12/1984 | Kejr | |
| 4,507,911 A | * | 4/1985 | Wolf | A01D 45/00 56/16.5 |
| 4,538,405 A | * | 9/1985 | Alexandrino | A01D 46/06 56/332 |
| 4,539,799 A | | 9/1985 | Kalverkamp | |
| 5,220,775 A | * | 6/1993 | Vogel | A01D 46/24 56/340 |
| 5,809,759 A | | 9/1998 | Zyla et al. | |
| 5,913,803 A | | 6/1999 | Moster | |
| 5,916,115 A | | 6/1999 | Pavone | A01D 46/24 56/332 |
| 7,555,888 B1 | * | 7/2009 | Boese | A01D 45/00 56/328.1 |
| 2005/0109001 A1 | | 5/2005 | Wolters et al. | |
| 2015/0156966 A1 | | 6/2015 | Lohrentz et al. | |
| 2024/0245005 A1 | * | 7/2024 | Zeelen | A01D 46/24 |

* cited by examiner

FIELD HARVESTING DEVICE FOR SMALL FRUITS

CROSS-REFERENCE TO RELATED APPLICATIONS

The present application claims priority to British request for patent application number 2116279.7 filed on Nov. 11, 2021, the disclosure of which is hereby incorporated in its entirety at least by reference.

BACKGROUND OF THE INVENTION

1. Field of the Invention

The present invention relates generally to farming equipment but more particularly to a field harvesting device for small fruits.

2. Description of Related Art

The machinery and methods for harvesting of crops can vary from crop to crop because of the morphology of the plant being harvested. That is why, as agriculture became more and more mechanized, a wide variety of implements have been created to adapt to various crops.

For example, U.S. Pat. No. 5,809,759 describes a crop harvester has bristle guards (39) mounted on the cutter bar as crop lifters and to capture fruit lost by dehiscence during cutting. Each bristle guard is a set of laterally oriented bristles. Dehisced fruit is swept into the header by a pickup reel having bristle bats. The bristles are supported on the leading side by a strip of flexible belting. The belting protects the bristle against being cut by the cutter bar. The crops are supported against being pushed forward by the bristle hats of the reel. The diameter is reduced to about one-half normal and the reel index in increased to provide an aggressive reel operation, ensuring that plants are properly engaged in the bristle guards for cutting.

U.S. Pat. No. 4,539,799 teaches a method for harvesting corn or other cereals with a harvester, particularly a combine attachment for a thresher-harvester, in which the ears of corn or other grains are separated from the plants by way of a single-sided draw of the crop through a gap and is characterized in that a mincing of the crop plants is effected simultaneously with the single-sided draw-through operation. The mincing occurs by a movement of the drawn crop plants relative to a stationary comminution device. A harvester for harvesting corn or other cereals is provided for the implementation of the method, being particularly designed so as to comprise a draw-in device having a gap between a draw-in drum and a shell portion for the draw-through of the crop plants, the gap being disposed across the direction of travel of the harvester, whereby the shell portion is designed for receiving a comminution device for mincing the plants and comprises a row of slots below the draw-in drum for receiving cutter blades therethrough.

This type of mechanism is suitable for plants having large stalks which contain hard grain held in bunches such as corn kernel or wheat, oat, rice, etc. . . . . It is not suitable for small soft fruits because they would be damaged during operation.

In a cotton stripper header, the rollers are made up of brushes and/or rubber strips which are inclined backwards and start close to the ground, forming a pronounced angle in relation to the ground. This system has a somewhat variable spacing, but the rollers do not include a worm screw to convey the stalks, and the harvested material is conveyed on screw conveyors either side and parallel to these units and in the direction of advancement before being transported on a conveyor system perpendicular to the direction of advancement.

International patent WO2015184496A1 describes a cutter bar assembly of a harvest header which includes longitudinally extending guard fingers which point forward, and with bristles which sweep back from the guard fingers at an acute angle relative to the longitudinal extension of the guard fingers. Accessories in the form of bristle crop holders are mounted to the guard fingers. The bristle crop holders comprise a body and rearwardly swept bristle fans which extend from the body. The bristle crop holders each include two or more bristle fans which are mounted one behind the other along the body.

The above described systems are not suited for harvesting small fruits as the arrangement and the type of mechanical components, even if similar in many of the inventions, such as fingers and worm screws, for example cannot be adapted for harvesting small fruits because of the differences in physical characteristics of the plants.

Small fruits are particularly difficult to harvest. That is why, to this day, workers, most notably migrant workers are used for the harvest. But with rules and regulations aimed at protecting workers, even if they are semi legal (or illegal) aliens, the cost of using such workers has gone up in recent years and is bound to increase more in the future. In order to keep market prices low, technology has to be used for lowering the cost of harvesting small fruits. There is therefore a motivation to create effective and low cost solutions to solve that problem.

BRIEF SUMMARY OF THE INVENTION

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

It is a main object of the present disclosure to provide for a field harvesting system for small fruits.

In order to do so, the present invention provides for a field harvesting device for small fruits having a harvesting header, a hitching pole and framework on wheels so as to be pulled by a moving motorized machine and the harvesting header is a single assembly comprised of a frame, conveyor, dividing cones, and a plurality of assemblies formed at first by worm screws, from each of which individual worm screw extends a rotating separator from which extends a shaft extending into a sprocket wheel. Two of the assemblies working as a pair of axially parallel aligned assemblies such that when one rotating separator, forming part of the pair, rotates clockwise and faces the other rotating separator forming part of the same pair rotates counterclockwise. The counter rotating separator having paddles which are configured for stripping fruits off of fruit plants; the stripped fruits are projected upwards by the action of the paddles rotating in an upward direction; the fruits fall onto U shaped cups located on the underneath supports, and roll off onto a primary conveyor. The primary conveyor conveys the fruits to an elevator conveyor which directs the fruits into a container. The assemblies are linked together at the back of the harvesting header by way of a roller chain connected to the sprocket wheels which are rotationally connected to pillow bearings mounted to the harvesting header frame and covered by a back cover. The assemblies are hold at the front end of the device by supports brackets mounted on a header frame member, which are rotationally connected by way of bearings that allow rotational movements of the assemblies.

In a preferred embodiment, the field harvesting has the linear arrangement of the assembly pairs creating a passageway between the rotating paddles so as to allow for the fruits to run along the length of the paddles and to be ripped off the branches since the fruits are of a diameter than is greater than the branches holding the fruits.

In another preferred embodiment, the device has the stripping intensity from the rotating separators that is modified by changing the number of paddles wherein on a given diameter, adding paddles causing a smaller arc length between each paddle, which reduces the variations in the size of the gap.

In yet another preferred embodiment, the device has a 4 paddles rotating separator having a gap ranging from 0.625 to 2.25 inches apart when the corresponding paddles are completely offset.

In still another preferred embodiment, the device has a 6 paddles rotating separator having a gap ranging from 0.625 to 1.5 inches apart when the corresponding paddles are completely offset.

In yet another preferred embodiment, the device has the elevator conveyor bringing the fruits directly to a container.

In yet another preferred embodiment, the device has the elevator conveyor bringing the fruits to a transverse worm screw running inside a tube having a bottom opening that allows for the fruits to fill in the container evenly across its width.

In still another preferred embodiment, the device has the shaped spoon mounted on an underneath support so as to catch the harvested material and slip them onto the conveyor belt.

The foregoing has outlined rather broadly the more pertinent and important features of the present disclosure so that the detailed description of the invention that follows may be better understood and so that the present contribution to the art can be more fully appreciated. Additional features of the invention will be described hereinafter which form the subject of the claims of the invention. It should be appreciated by those skilled in the art that the conception and the disclosed specific methods and structures may be readily utilized as a basis for modifying or designing other structures for carrying out the same purposes of the present disclosure. It should be realized by those skilled in the art that such equivalent structures do not depart from the spirit and scope of the invention as set forth in the appended claims.

BRIEF DESCRIPTION OF THE SEVERAL VIEWS OF THE DRAWINGS

Other features and advantages of the present invention will become apparent when the following detailed description is read in conjunction with the accompanying drawings, in which.

DETAILED DESCRIPTION OF THE PREFERRED EMBODIMENT

The following description is provided to enable any person skilled in the art to make and use the invention and sets forth the best modes contemplated by the inventor of carrying out his invention. Various modifications, however, will remain readily apparent to those skilled in the art, since the general principles of the present invention have been defined herein.

It is to be understood that the terminology used herein is for the purpose of describing particular embodiments only and is not intended to be limiting. The terms "a" or "an," as used herein, are defined as to mean "at least one". The term "plurality," as used herein, is defined as two or more. The term "another," as used herein, is defined as at least a second or more. The terms "including" and/or "having," as used herein, are defined as comprising (i.e., open language). The term "coupled," as used herein, is defined as connected, although not necessarily directly, not necessarily mechanically, and not permanent. The term "providing" is defined herein in its broadest sense, e.g., bringing/coming into physical existence, making available, and/or supplying to someone or something, in whole or in multiple parts at once or over a period of time. As used herein, the terms "about", "generally", or "approximately" apply to all numeric values, whether or not explicitly indicated. These terms generally refer to a range of numbers that one of skill in the art would consider near the stated amount by about 0%, 5%, or 10%, including increments therein. In many instances these terms may include numbers that are rounded to the nearest significant figure.

Figure 6:
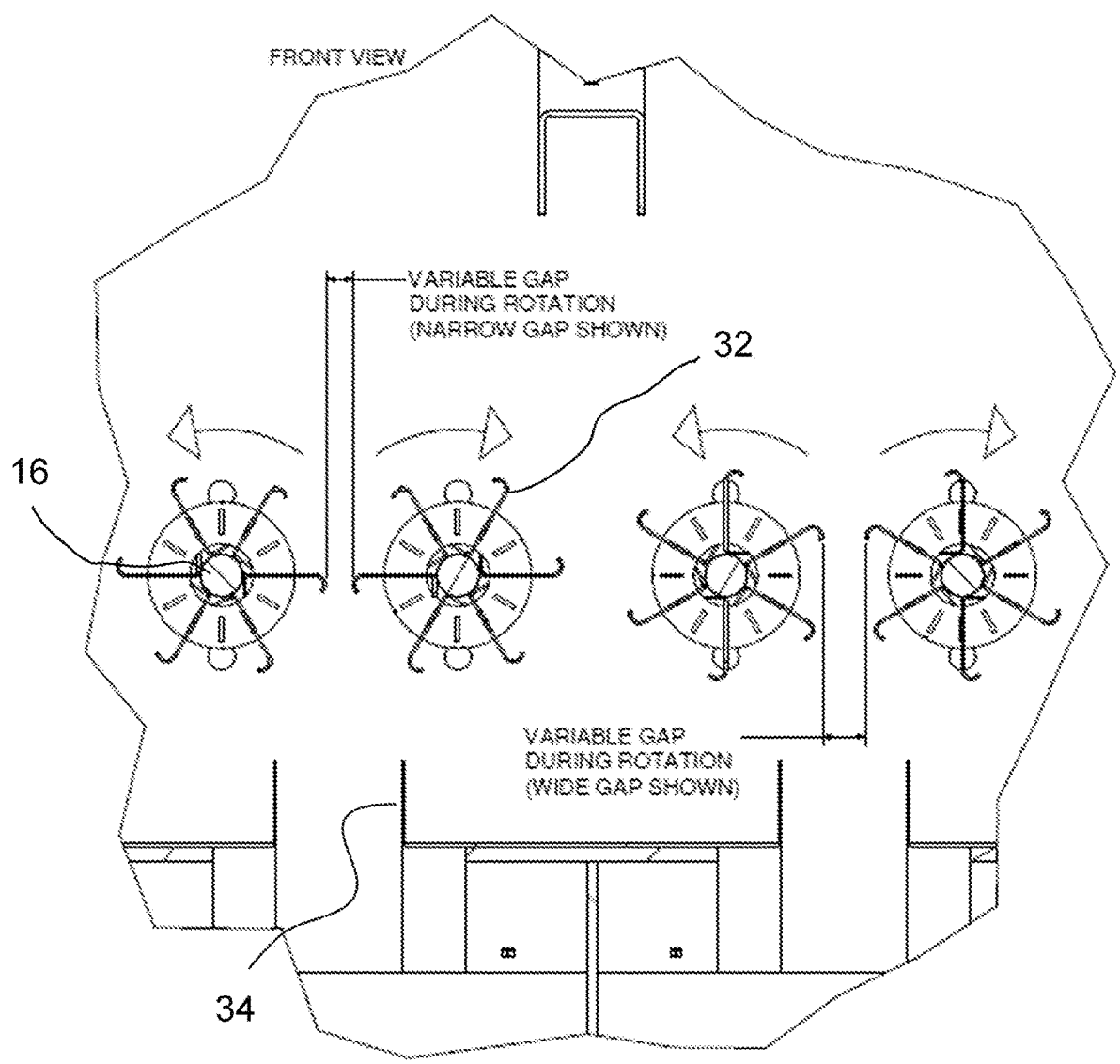
FIG. 6 Schematic front view of the rotating patterns of the rotating separators.

Referring now to any of the accompanying figures, there is provided a device 10 using at least one pair but preferably a plurality of worm screws 12 wherein each worm screw 12 is paired with another worm screw 12 such that they form pairs of worm screws 12 that counter rotate, that is, the one on the left rotates counterclockwise and the other rotates clockwise so that the two facing rotations rotate upwardly, as seen if FIG. 6. The overall assembly of worm screw 12, rotating separator 16 and shaft 30 are linked together by way of a roller chain 31 running on identical sprockets 15 mounted on shafts 30 at the back of the header platform 22. The linear movement of the roller chain 31 coming from an input power induces an equal rotational speed to the assembly that can be variable by modifying the input speed. Other way of inducing motion are possible, for example by a transverse shaft with bevel gears.

The coiled action of the worm screws 12 moves the crop 21 towards the rear of the worm screws 12 where each worm screw 12 extends into one of a plurality of rotating separators 16, which continue with the counter rotating scheme which causes an upward stripping effect which strips the fruits from the crop 21.

Figure 1:
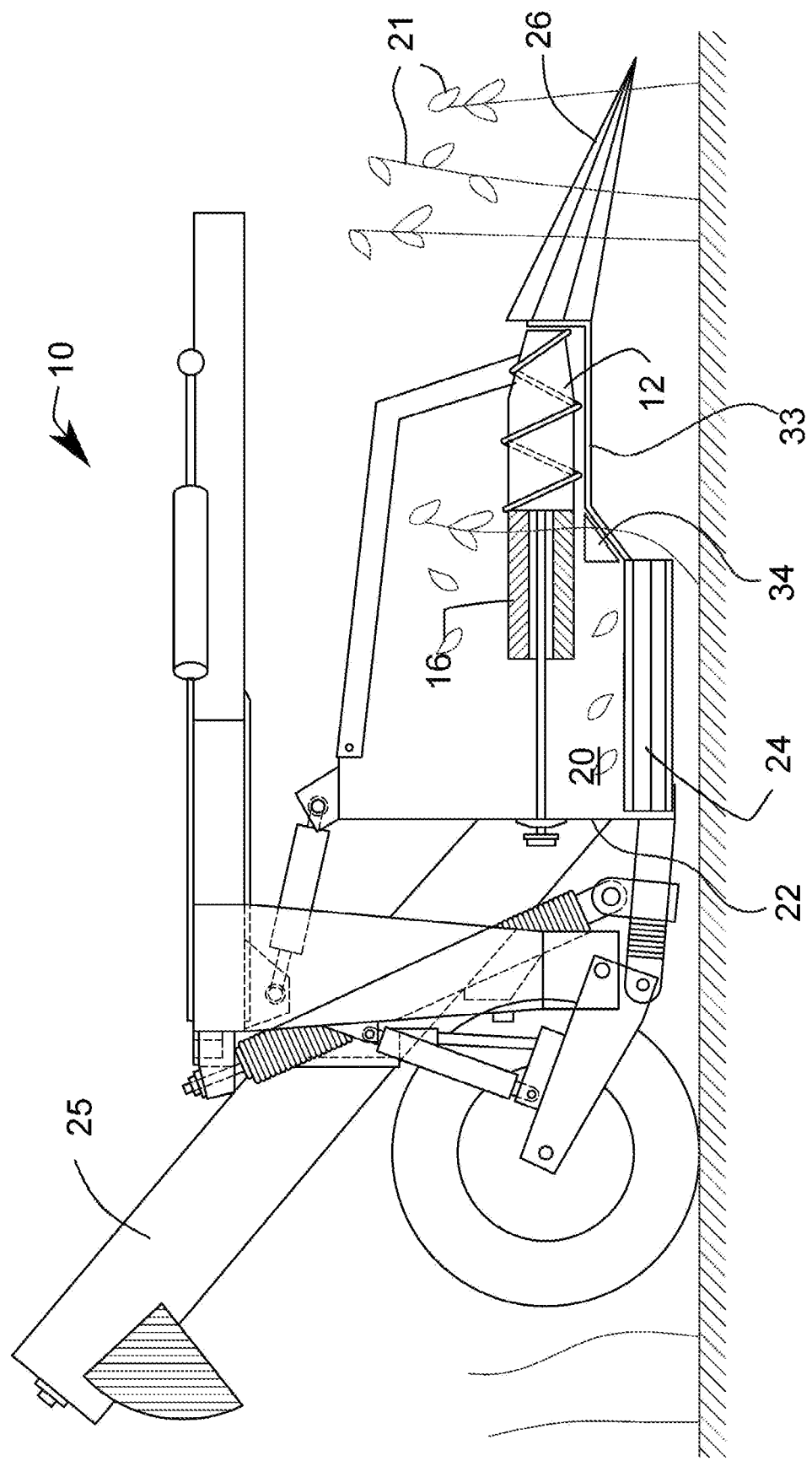
FIG. 1 Side elevational view according to an embodiment of the invention.

The rotating separator 16, worm screws 12, and dividing cones 26 are all in line and parallel to the forward motion of the device 10 so as to create a passageway for the crop 21. As shown on FIG. 1, a preferred embodiment is when the assembly 12, 16, 30 is parallel to the ground but could also be effective to a certain point with positive or negative angle from front to back. The device 10 itself can be attached to already existing self-propelled machinery (tractor, swather, combine harvester, etc) or mounted on axles and dragged behind a tractor.

As the device 10 moves forward in a field, the crop 21 is combed by way of dividing cones 26 which separate the stems of the crop 21 as they pass on their way towards the passageways 14 formed by the association of left and right worm screws 12, as described earlier. The dividing cones 26 are components that are well known in the art of farm machines and need not be further discussed herein as they perform a well known task.

In some farm machines, there is a single worm screw 12 which runs transversally instead of being in line with the forward motion of the equipment. Such is also the case for paddle mechanisms which run more like paddle wheels of paddle boats in the sense that they also rotate perpendicularly from the forward motion of the equipment and can be also used to strip material from the plants. The arrangement seen here allows for more time for the fruits to be ripped off the branches because they run along the length of the paddles 32 instead of hitting it face first as in the prior art. The part of the plant to be removed being of a diameter that is greater than the width of the passageway 14 created by the rotating paddles 32, aligned with one another at the center of the axis, ensures that the fruit part of the plant is stripped off the plant and projected upwards and backwards to fall down so as to be further carried by a primary conveyor 24 which routes the fruits to an elevator conveyor 25. The elevator conveyor 25 can bring the fruits directly to a container 23, or, as best seen in FIG. 3, to a transverse worm screw (not shown) running inside a tube 29 having a bottom opening 35 that allows for the fruits to fill in the container 23 in a more evened out fashion across its width.

Figure 3:
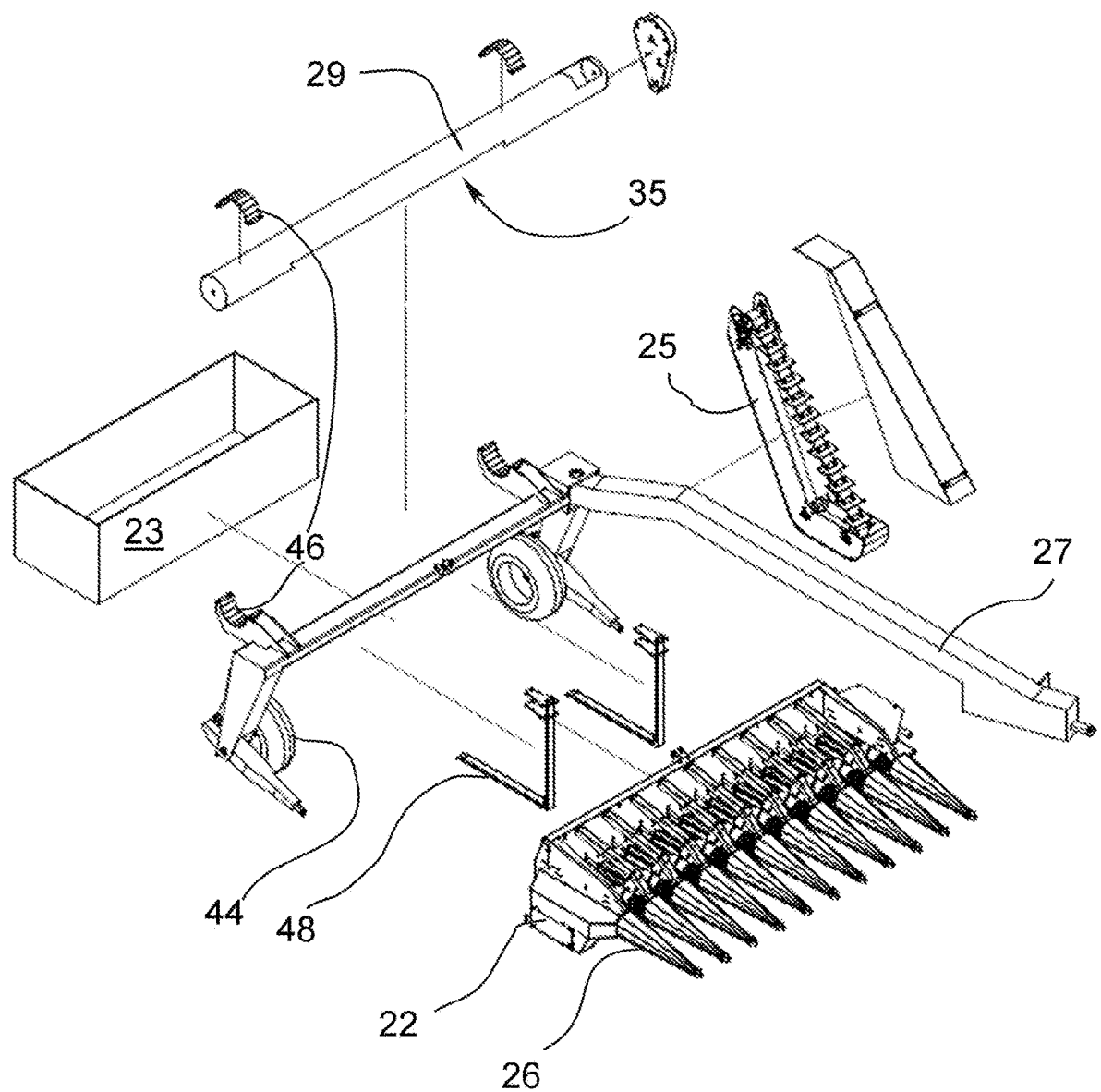
FIG. 3 Exploded view of some components of the invention.
Figure 4:
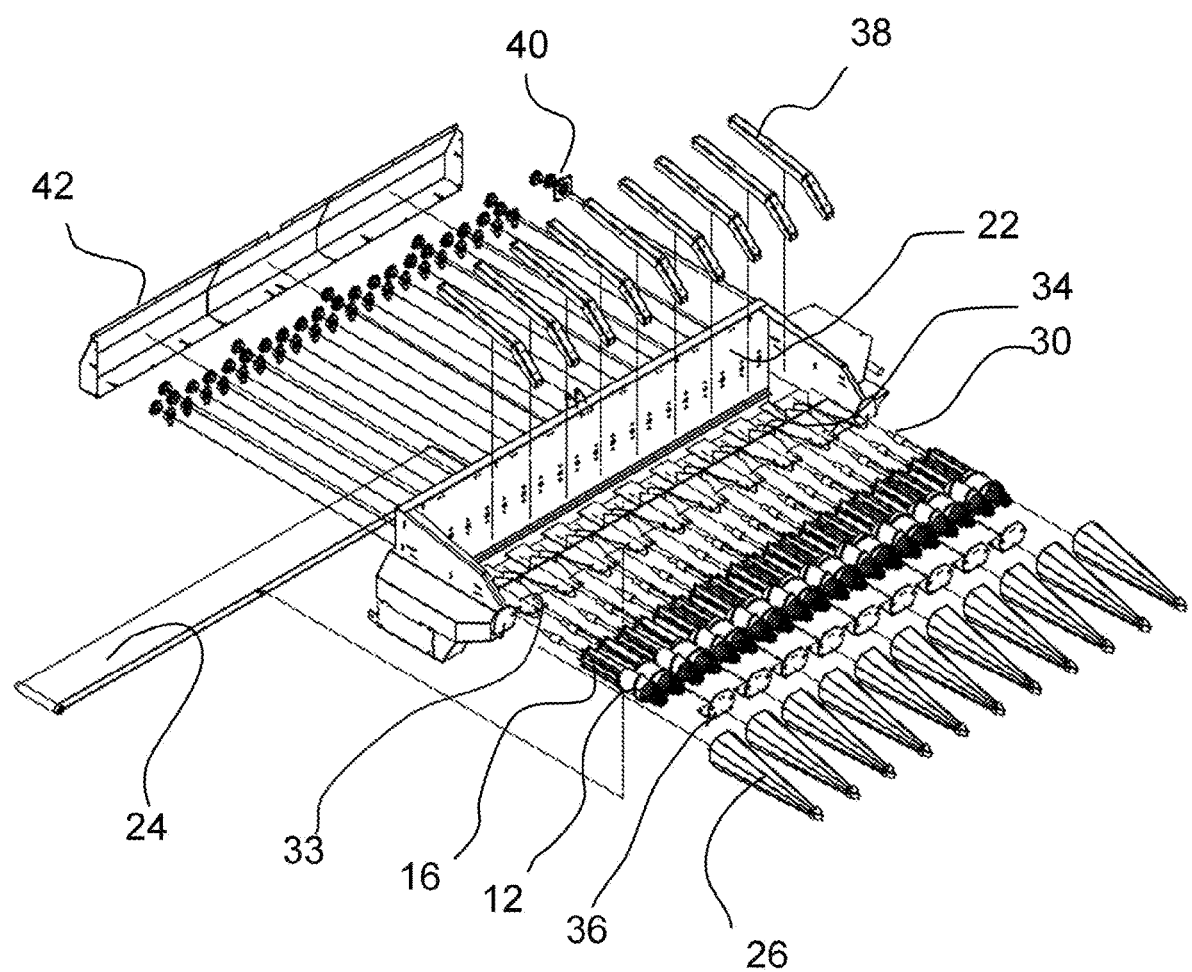
FIG. 4 Exploded view of the main components of the invention.
Figure 5A:
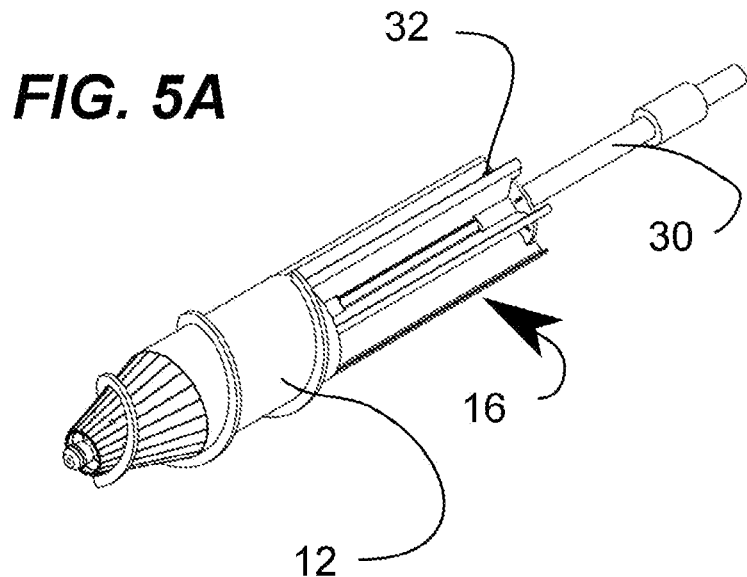
FIGS. 5A-D Isometric, top, and front views of the worm screw rotating separator and shaft.
Figure 5B:
Figure 5C:
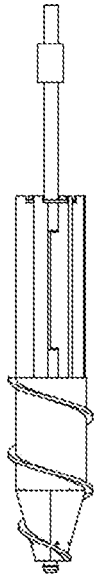
Figure 5D:

As best seen in FIGS. 3 and 4, the device 10 is primarily composed of a header platform 22 fitted with the primary conveyor 24, dividing cones 26, worm screw 12, rotating separator 16 and shaft 30. The overall assembly comprised of the worm screw 12, rotating separator 16 and shaft 30 are held in place by support brackets 36 positioned towards the front end of the device 10 and by a header frame member 22 at the rear by way of pillow bearings 40 mounted on frame 22 which are covered by a back cover 42. The support brackets 36 are themselves held by way of underneath support 33 (FIGS. 1 and 4) and overhead supports 38.

Figure 2:
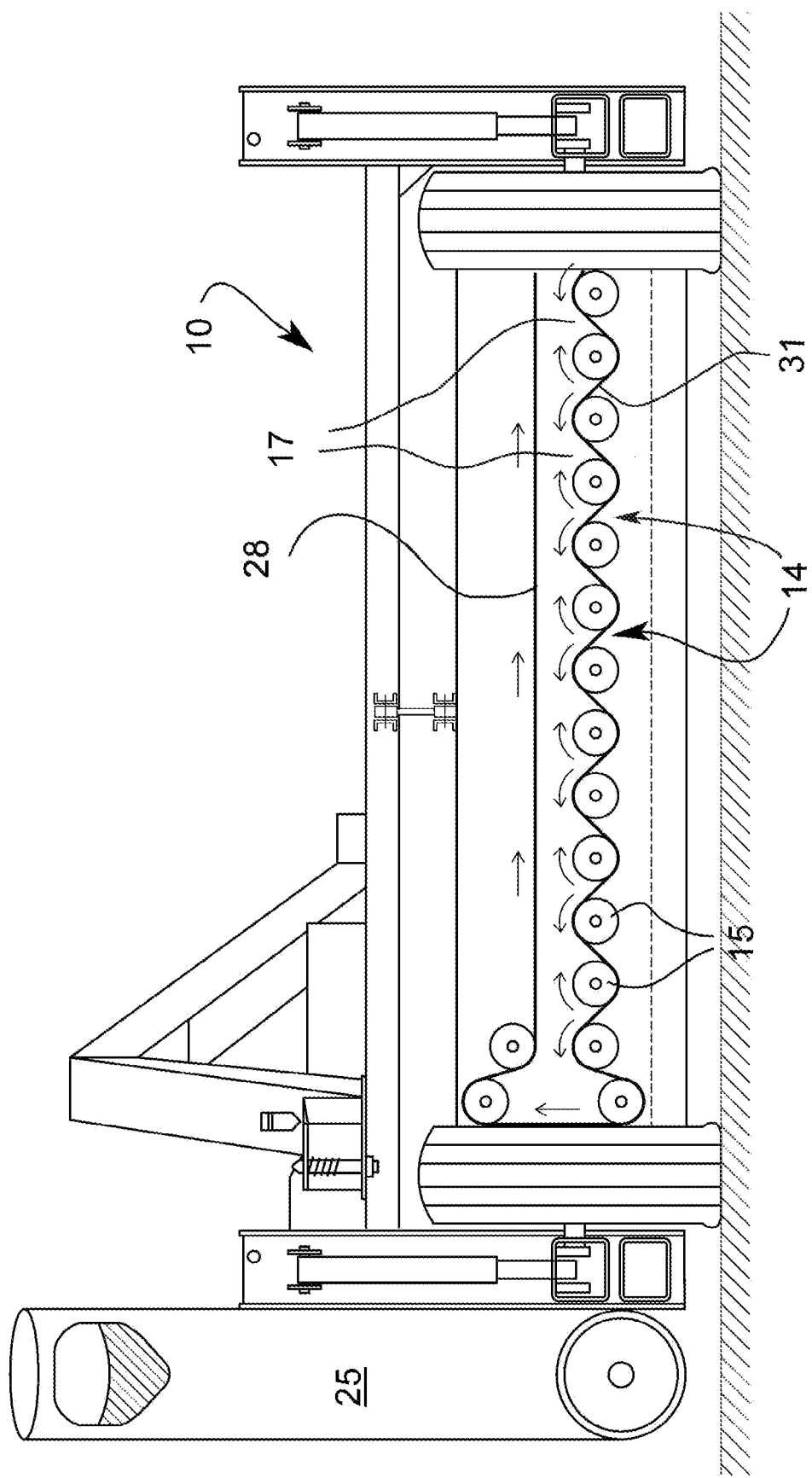
FIG. 2 Front elevational view according to an embodiment of the invention.

As best seen in FIG. 2, to collect the portion of small fruits that are projected upward and fall at the front part and through a gap 17 between the downwardly turning rotating separators 16 that does not work together for stripping (FIG. 2, 17), shaped cups 34 are mounted on the underneath support 33 so as to catch the harvested material and slip it onto the conveyor belt 24.

As best seen in FIG. 6, during operation, the paddles 32 are rotating and the number of paddles 32 per rotating separator 16 influences the separation space and the number of times the spacing opens and closes at each turn. As a result, several arrangements are possible depending on the type of crop or the physical characteristics of the crop to be harvested.

More paddles 32 reduce the variations in spacing during the rotating separator's 16 revolution. There is a smaller arc length between each paddle 32 on a given circumference of the rotating separator 16 when there are more paddles 32, which results in the narrow gap 14 remaining the same, but the wide gap 14 being tighter and more aggressive on the crop.

For example: Having 4 paddles means that the paddles 32 will hit four times per revolution. The narrow gap 14 formed by the tips of the axis aligned paddles 32 is 0.625 inches and go to 2.25 inches apart when the corresponding paddles 32 are completely offset. With 6 paddles 32 it becomes six hits per revolution with the narrow gap 14 still at 0.625 inches and the distal extremity of corresponding paddles 32 are at 1.5 inches apart from each other when completely offset.

It is also this variable spacing which makes it possible to reduce the traction on the stems which slips freely under the header platform 22 and as such, avoid uprooting the plants which would otherwise jam the paddle 32 rotation.

Besides the number of paddles 32, the rotational speed, and forward speed of the device 10 also influence the number of times a given stem will be hit by the paddles 32 and as such, the chances of the plants being uprooted. Also, as seen on FIG. 1, a preferred distance between the back end of the worm screw 12 and the front part of the primary conveyor 24 allows for a certain quantity of stems to be simultaneously in the separation gap 14 without excessive bending backward which could also cause uprooting of the plants.

Other components are common variants of existing farm equipment or obvious components such as a hitching pole and framework 27 on wheels 44, which holds and pulls the device 10, clamps 46 to hold the tube 29. Forks 48 to hold the container 23.

Also, the field harvesting device 10 is not only being pulled by existing self-propelled machineries as mentioned before, it could be also powered by that same machinery for actuating all the worm screws 12, transverse worm screw, rotating separators 16 and the conveyors 24, 25, the sprockets and roller chain 15, 31, among other things, and therefore this need not be discussed herein as all manners of gears and belts used are well known in the art.

Although the invention has been described in considerable detail in language specific to structural features, it is to be understood that the invention defined in the appended claims is not necessarily limited to the specific features described. Rather, the specific features are disclosed as exemplary preferred forms of implementing the claimed invention. Stated otherwise, it is to be understood that the phraseology and terminology employed herein, as well as the abstract, are for the purpose of description and should not be regarded as limiting. Therefore, while exemplary illustrative embodiments of the invention have been described, numerous variations and alternative embodiments will occur to those skilled in the art. Such variations and alternate embodiments are contemplated, and can be made without departing from the spirit and scope of the invention.

It should further be noted that throughout the entire disclosure, the labels such as left, right, front, back, top, bottom, forward, reverse, clockwise, counter clockwise, up, down, or other similar terms such as upper, lower, aft, fore, vertical, horizontal, oblique, proximal, distal, parallel, perpendicular, transverse, longitudinal, etc. have been used for convenience purposes only and are not intended to imply any particular fixed direction or orientation. Instead, they are used to reflect relative locations and/or directions/orientations between various portions of an object.

In addition, reference to "first," "second," "third," and etc. members throughout the disclosure (and in particular, claims) are not used to show a serial or numerical limitation but instead are used to distinguish or identify the various members of the group.

What is claimed is:

1. A field harvesting device for small fruits comprising
a harvesting header,
a hitching pole and
a framework on wheels so as to be pulled by a moving motorized machine, wherein the harvesting header is a single assembly comprised of
a frame,
a conveyor,
dividing cones, and
a plurality of assemblies formed at first by worm screws, from each of which individual worm screw extends a rotating separator from which extends a shaft extending into a sprocket wheel;
wherein two of the plurality of assemblies work as a pair of axially parallel aligned assemblies facing each other such that when one rotating separator, forming part of the pair, rotates clockwise, the other rotating separator forming part of the same pair rotates counterclockwise,
wherein the counter-rotating separators comprise paddles configured for stripping fruits off of fruit plants, wherein the stripped fruits are projected upwards by the action of the paddles rotating in an upward direction away from each other such that the fruits fall onto U shaped cups located on underneath supports, and roll off onto a primary conveyor;
the primary conveyor conveys the fruits to an elevator conveyor which directs the fruits into a container;
wherein the assemblies are linked together at the back of the harvesting header by way of a roller chain connected to the sprocket wheels which are rotationally connected to pillow bearings mounted to the harvesting header frame and covered by a back cover;
the assemblies are held at the front end of the device by supports brackets mounted on the header frame member, and
wherein the assemblies are rotationally connected by way of the pillow bearings that allow rotational movements of the assemblies.

2. The field harvesting device of claim 1 wherein: the linear arrangement of the assembly pairs creating a passageway between the rotating paddles so as to allow for the fruits to run along the length of the paddles and to be ripped off the branches since the fruits are of a diameter that is greater than the branches holding the fruits.

3. The field harvesting device of claim 2 wherein: the stripping intensity from the rotating separators are modifiable by changing the number of paddles wherein on a given diameter, adding paddles causes a smaller arc length between each paddle, which reduces the variations in the size of a gap.

4. The field harvesting device of claim 2 wherein: a 4 paddles rotating separator having a gap between adjacent separators in each assembly pair ranging from 0.625 to 2.25 inches apart when the corresponding paddles are completely offset.

5. The field harvesting device of claim 2 wherein: a 6 paddles rotating separator having a gap between adjacent separators in each assembly pair ranging from 0.625 to 1.5 inches apart when the corresponding paddles are completely offset.

6. The field harvesting device of claim 2 wherein: the elevator conveyor bringing the fruits directly to the container.

7. The field harvesting device of claim 2 wherein: the elevator conveyor bringing the fruits to a transverse worm screw running inside a tube having a bottom opening that allows for the fruits to fill in the container evenly across its width.

* * * * *